US012474493B2

(12) United States Patent
Cao et al.

(10) Patent No.: US 12,474,493 B2
(45) Date of Patent: Nov. 18, 2025

(54) ROCK BURST HAZARD PREDICTION METHOD BASED ON SEISMIC WAVE ENERGY ATTENUATION CHARACTERISTICS OF MINE EARTHQUAKE CLUSTER

(71) Applicants: China University of Mining and Technology, Xuzhou (CN); Xuzhou Wushuo Information Technology Co., Ltd., Xuzhou (CN); Xuzhou Hongyi Technology Development Co., Ltd., Xuzhou (CN)

(72) Inventors: Anye Cao, Xuzhou (CN); Yaoqi Liu, Xuzhou (CN); Chengchun Xue, Xuzhou (CN); Changbin Wang, Xuzhou (CN); Xu Yang, Xuzhou (CN); Yingyuan Wen, Xuzhou (CN); Wenhao Guo, Xuzhou (CN); Songwei Wang, Xuzhou (CN); Xianxi Bai, Xuzhou (CN); Guowei Lv, Xuzhou (CN); Yujie Peng, Xuzhou (CN); Geng Li, Xuzhou (CN); Zhifeng Ma, Xuzhou (CN); Jianqiu Xue, Xuzhou (CN)

(73) Assignees: China University of Mining and Technology, Xuzhou (CN); Xuzhou Wushou Information Technology Co., Ltd., Xuzhou (CN); Xuzhou Hongyi Technology Developmentt Co., Ltd., Xuzhou (CN)

( * ) Notice: Subject to any disclaimer, the term of this patent is extended or adjusted under 35 U.S.C. 154(b) by 248 days.

(21) Appl. No.: 17/993,895

(22) Filed: Nov. 24, 2022

(65) Prior Publication Data
US 2023/0168406 A1    Jun. 1, 2023

(51) Int. Cl.
*G01V 1/30* (2006.01)
*G01V 1/28* (2006.01)

(52) U.S. Cl.
CPC .............. *G01V 1/306* (2013.01); *G01V 1/288* (2013.01); *G01V 2210/62* (2013.01)

(58) Field of Classification Search
CPC ..... G01V 1/306; G01V 1/288; G01V 2210/62
See application file for complete search history.

(56) References Cited

U.S. PATENT DOCUMENTS 7,277,797 B1 * 10/2007 Kunitsyn ................. G01V 1/01
    702/15
11,169,288 B1 * 11/2021 Johnson ................. G06N 20/10

OTHER PUBLICATIONS

Zeng et al., "Design of Microseismic Monitoring System Based on Virtual Instrument", 2013, IEEE Publication, 6th ISOCID, pp. 285-288 (Year: 2013).*

* cited by examiner

*Primary Examiner* — Elias Desta
(74) *Attorney, Agent, or Firm* — Bayramoglu Law Offices LLC

(57) ABSTRACT

A rock burst hazard prediction method based on vibration wave energy attenuation characteristics of a mine earthquake cluster is provided. The rock burst hazard prediction method comprehensively considers the static load and dynamic load effects of the vibration waves of the mine earthquake cluster based on vibration wave energy attenuation characteristics of the mine earthquake cluster. The static load strength index and the dynamic load strength index involved in the method have clear physical meanings. A comprehensive prediction index calculation model proposed based on the dynamic and static load superposition principle of rock burst occurrence is clear, and the method has a firm theoretical support as well as strong universality (Continued)

and operability. Meanwhile, the updating and adjustment of weights are rapid and the objective judgment and prediction of the final comprehensive prediction results are efficient, and the high-energy mine earthquake and impact behavior area can be effectively predicted.

14 Claims, 12 Drawing Sheets

ROCK BURST HAZARD PREDICTION METHOD BASED ON SEISMIC WAVE ENERGY ATTENUATION CHARACTERISTICS OF MINE EARTHQUAKE CLUSTER

CROSS REFERENCE TO THE RELATED APPLICATIONS

This application is based upon and claims priority to Chinese Patent Application No. 202111421167.1, filed on Nov. 26, 2021, the entire contents of which are incorporated herein by reference.

TECHNICAL FIELD

The present invention relates to the technical field of coal mining and coal mine safety, and in particular to a rock burst hazard prediction method based on seismic wave energy attenuation characteristics of a mine earthquake cluster.

BACKGROUND

A rock burst is a dynamic phenomenon of sudden and severe destruction of coal (rock) masses around a coal mining space due to the instantaneous release of elastic deformation energy, and is often accompanied by instantaneous displacement and throwing of coal (rock) masses, loud noise and air blast. In recent years, due to the rapid increase of coal mining depth in China, the geological and mining conditions become more complicated, and rock burst accidents occur frequently. The occurrence of rock bursts is closely related to mining disturbance, roof movement and tectonic movement. In the process of mining disturbance, rapid adjustment of the stress state of coal-rock masses in the mining space, and the fracture of coal-rock masses can produce a lot of vibration and radiate energy outwards in the form of seismic waves to further result in secondary disturbance to the mining space; besides, cumulative damage is caused to the coal-rock masses under the repeated action of seismic waves, thereby reducing the strength of coal-rock masses, and increasing the probability of inducing rock bursts.

According to considerable theoretical researches, the occurrence of rock bursts meets the dynamic and static load superposition principle. Specifically, it can be briefly described as the superposition of the mine earthquake dynamic load, such as mining disturbance and roof movement, and the static load imposed on coal-rock masses, and a rock burst will be induced if the superposition exceeds the bearing limit of the coal-rock masses. In this process, the seismic waves radiated by the mine earthquake cluster are superposed with each other; on the one hand, the cumulative damage of coal-rock masses is caused to result in a sharp adjustment of their stress state; and on the other hand, the elastic energy accumulation is caused in the coal-rock masses, and the rock burst will be induced when the superposition action of the two exceeds the bearing limit of the coal masses. Therefore, how to accurately describe the damage and stress state of coal-rock masses and the elastic energy accumulation caused by seismic waves under the continuous disturbance of a mine earthquake cluster is crucial to the prediction of rock bursts.

After being excited by the rupture of a seismic source of a mine earthquake, the seismic waves act on the coal-rock masses after undergoing a complex attenuation process under the action of geometric diffusion and medium damping during propagation. Therefore, the keys for achieving accurate prediction and quantitative expression of rock burst hazards include how to describe the propagation attenuation characteristics of the seismic waves and calculate the energy that really acts on the coal-rock masses, how to describe the damage and stress state of the coal-rock masses under the continuous action of the seismic waves, how to depict the elastic energy accumulation state caused by the seismic waves of the mine earthquake cluster, comprehensively considering the superposition effect of the two, performing specific quantification using existing monitoring methods and proposing a prediction method and index with clear physical meanings.

A microseismic monitoring system is widely deployed in rock burst mines to capture mine earthquake signals. By using the system, clear waveforms of seismic signals can be obtained, and the original time, spatial coordinate and energy of a seismic source can be accurately calculated. Through further post-processing of microseismic information, it is possible to realize the accurate expression of the attenuation characteristics of the seismic waves of the mine earthquake cluster and the calculation of residual energy, and construct the indexes which characterize the damage of coal-rock masses, the static load stress state and the degree of elastic energy accumulation under the action of seismic wave disturbance and can predict rock burst hazards.

SUMMARY

The present invention is intended to provide a rock burst hazard prediction method based on seismic wave energy attenuation characteristics of a mine earthquake cluster, in order to solve the above-mentioned problems existing in the prior art and quantitatively analyze the cumulative damage effect of mine earthquake seismic waves on the coal-rock masses and the energy accumulation effect, thereby achieving the accurate prediction of a rock burst hazard.

In order to realize the above-mentioned objective, the present invention provides the following solutions: the present invention is intended to provide a rock burst hazard prediction method based on seismic wave energy attenuation characteristics of a mine earthquake cluster, including predicting a rock burst hazard through seismic wave energy attenuation characteristics of a mine earthquake cluster by comprehensively considering static load and dynamic load effects of seismic waves of the mine earthquake cluster; wherein the method specifically includes the following steps: constructing a static load strength index based on the seismic wave energy attenuation characteristics of the mine earthquake cluster by considering the cumulative damage effect of the mine earthquake seismic waves on coal-rock masses; constructing a dynamic load strength index based on the energy attenuation characteristics of the mine earthquake cluster and considering the energy accumulation effect of the mine earthquake seismic waves; and then determining weights of both indexes using a mean square error method, and further constructing a comprehensive prediction index by superposing the two indexes to predict the rock burst hazard.

As a preferred technical solution of the present invention, the residual energy of seismic waves of a seismic source in the mine earthquake cluster after propagation attenuation is calculated by the following formula:

$$\begin{cases} E_{ij} = E_j (R_{ij} \le r_0) \\ E_{ij} = E_j r_0^{-2} R_{ij}^{-2} e^{-\eta(R_{ij}-r_0)} (R_{ij} > r_0) \\ ppv_{ij} = ppv_j R_{ij}^{-1} e^{-\beta R_{ij}} (R_{ij} > r_0), \eta = 2\beta \end{cases}$$

where $E_{ij}$ is a residual energy of a seismic source in the mine earthquake cluster after propagation from a point j to a point i; $E_j$ is an energy of the seismic source at the point j; $ppv_{ij}$ is a peak particle velocity caused by the propagation of seismic waves radiated by the seismic source from the point j to the point i; $ppv_j$ is a peak particle velocity of the seismic source at the point j; $R_{ij}$ is a linear distance between the point j and the point i; $r_0$ is a radius of the seismic source; $\eta$ is an energy attenuation coefficient; and $\beta$ is a peak particle seismic velocity attenuation coefficient.

$\beta$ is obtained by fitting the relationship between the peak particle velocity recorded by a plurality of probes not exceeding a measuring range in a microseismic monitoring system and a distance from each probe to the seismic source.

As a preferred technical solution of the present invention, the radius $r_0$ of the seismic source is calculated by the following formula:

$$\begin{cases} r_0 = \sqrt[3]{\dfrac{3V_A}{4\pi}} \\ V_A = \dfrac{M_0^2}{2GE_j} \end{cases}$$

where $V_A$ is an apparent volume of the seismic source; G is a shear modulus of a coal-rock mass; $M_0$ is a seismic moment of the seismic source; and $E_s$ is an energy of the seismic source.

As a preferred technical solution of the present invention, the damage and the static load strength imposed on a coal-rock mass under the disturbance of seismic waves of the mine earthquake cluster are characterized by the following formulas and indexes:

$$\varepsilon_{eij} = \sum_{i=1}^{N} k\sqrt{E_{ij}}$$

$$\varepsilon_f = -\dfrac{\varepsilon_{ef}}{\ln(1-D_F)}$$

$$\sigma_{si} = E\varepsilon_{eij}\exp\left(-\dfrac{\varepsilon_{eij}}{\varepsilon_f}\right)$$

$$\phi_{si} = \dfrac{\sigma_{si} - \sigma_{smin}}{\sigma_{smax} - \sigma_{smin}}$$

where $\varepsilon_{eij}$ is a cumulative Benioff strain at any node i in a grid area; N is a total number of grid nodes; $\varepsilon_{ef}$ is the maximum of $\varepsilon_{eij}$ among the grid nodes in the grid area; $D_F$ is a critical damage value which is 0.95; $\sigma_{si}$ is a static load stress index at any node i, and E is an elastic modulus of a coal-rock mass; $\Phi_{si}$ is a static load strength index at any node i; $\sigma_{smax}$ is the maximum of $\sigma_{si}$ among all the nodes in the grid area; and $\sigma_{smin}$ is the minimum of $\sigma_{si}$ among all the nodes in the grid area.

As a preferred technical solution of the present invention, the degree of energy accumulation and the dynamic load strength index of a coal-rock mass under the disturbance of seismic waves of the mine earthquake cluster are characterized by the following formulas and indexes:

$$\sigma_{di} = \sum_{j=1}^{N} E_{ij}$$

$$\phi_{di} = \dfrac{\sigma_{di} - \sigma_{dmin}}{\sigma_{dmax} - \sigma_{dmin}}$$

where $\sigma_{di}$ is an energy accumulation index at any node i in a grid area; $\Phi_{di}$ is a dynamic load strength index at any node i; $\sigma_{dmax}$ is the maximum of $\sigma_{di}$ among all the nodes in the grid area; and $\sigma_{dmin}$ is the minimum of $\sigma_{di}$ among all the nodes in the grid area.

As a preferred technical solution of the present invention, the comprehensive prediction index of a rock burst hazard is constructed by the following formula:

$$\phi_{sdi} = w_1 \phi_s + w_2 \phi_d = w_1 \dfrac{\sigma_{si} - \sigma_{smin}}{\sigma_{smax} - \sigma_{smin}} + w_2 \dfrac{\sigma_{di} - \sigma_{dmin}}{\sigma_{dmax} - \sigma_{dmin}}$$

where $\Phi_{sdi}$ is a comprehensive prediction index value at any node i in a grid area; $w_1$ and $w_2$ are weights of $\Phi_s$ and $\Phi_d$ determined by using the mean square error method, respectively, and both $w_1$ and $w_2$ are ranging between 0 and 1.

$w_1$ and $w_2$ are calculated by the following formulas, respectively:

$$w_1 = \dfrac{std(\phi_{si})}{std(\phi_{si}) + std(\phi_{di})}$$

$$w_2 = \dfrac{std(\phi_{di})}{std(\phi_{si}) + std(\phi_{di})}$$

where std ($\Phi_{si}$) is a square error of $\Phi_{si}$ at all the nodes in the grid area; and std ($\Phi_{di}$) is a square error of $\Phi_{di}$ at all the nodes in the grid area.

As a preferred technical solution of the present invention, when the residual energy $E_{ij}$ of the seismic waves after propagation attenuation is calculated, the energy attenuation coefficient is selected according to an energy level of the seismic source; during the calculation, the research area is divided into a grid formed by several nodes, and the residual energy of the seismic waves after attenuation, the static load strength index and the dynamic load strength index are all calculated by using the same grid model; according to the value of the comprehensive prediction index, the hazard level can be classified into four levels: none, weak, moderate and strong; and a predicted object is a high-energy mine earthquake or impact behavior area.

The present invention discloses the following technical effects: the static load strength index and the dynamic load strength index involved in the method have clear physical meanings; a comprehensive prediction index calculation model proposed based on the dynamic and static load superposition principle of rock burst occurrence is clear, and the method has a firm theoretical support as well as strong universality and operability. Meanwhile, the updating and adjustment of weights are rapid and the objective judgment and prediction of the final comprehensive prediction results are efficient, and high-energy mine earthquake and impact behavior area can be effectively predicted.

BRIEF DESCRIPTION OF THE DRAWINGS

In order to explain the present invention or the technical solutions in the prior art more clearly, the drawings to be used in the embodiments will be briefly introduced below. Obviously, the drawings described below are only some embodiments of the present invention. For those skilled in the art, other drawings may be obtained based on these drawings without making creative efforts.

DETAILED DESCRIPTION OF THE EMBODIMENTS

The present invention will be further explained below in combination with the drawings.

Figure 2:
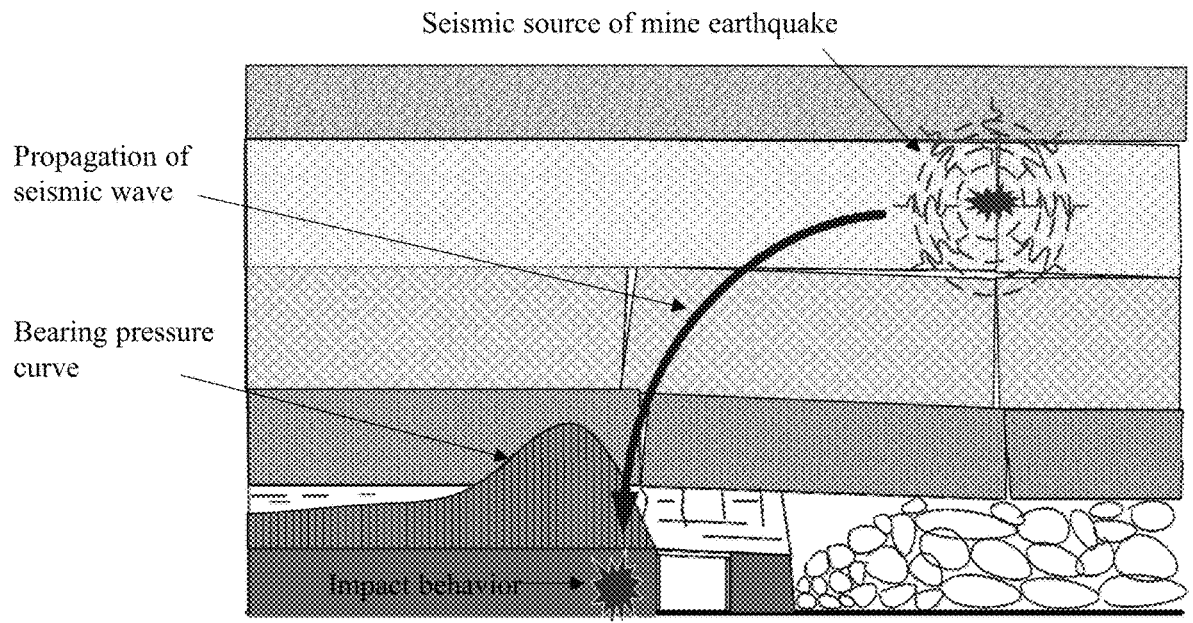
FIG. 2 is a schematic diagram of a mechanism of induction by the superposition of static and dynamic loads of a rock burst.
Figure 3:
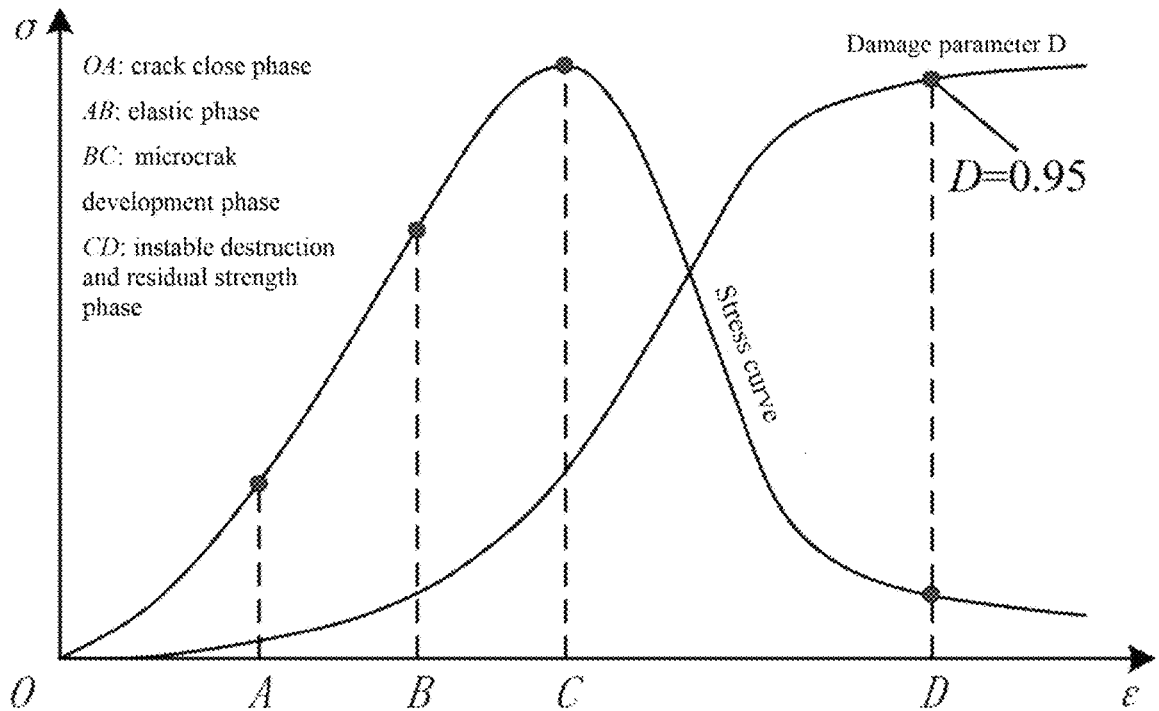
FIG. 3 shows changes and a schematic diagram of a bearing pressure and damage parameter of a coal-rock mass.

Under the condition of the original geostress, the original rock is in a quasi-hydrostatic pressure state. After a coal mass is mined, a bearing pressure zone is formed in front of a coal wall horizontally; with the advance of a working face, the bearing pressure in the coal mass gradually increases from a three-way isobaric hydrostatic pressure state to a peak stress, and then a pressure relief state appears with the destruction of the coal mass; the vertical stress gradually decreases to a single-pressure residual strength state at the coal wall (FIG. 2), and a changing process of the stress (FIG. 3) can be expressed by the following formula according to the continuum damage mechanics:

$$\sigma = E\varepsilon(1-D) \qquad (1)$$

where $\sigma$ is a stress state of a coal-rock mass, $\varepsilon$ is a strain, E is an elastic modulus, and D is a damage parameter.

On the other hand, with the advance of the working face, the scope of a goaf increases continuously. When the goaf increases to a certain space, a roof above the goaf will break, slip and lose stability, so that a mine earthquake may be induced and seismic waves may be radiated from the center of the seismic source; at the same time, underground mining disturbance, fault slip and gas outburst in the process may lead to further fracture of coal-rock masses to radiate seismic waves outwards; when a dynamic load caused by the seismic waves is superposed with a static load of the coal masses around the mining space, and a rock burst may be induced once a bearing limit of the coal mass is exceeded; this process is known as a dynamic and static load superposition principle of rock burst occurrence (FIG. 2), and the principle can be expressed by the following formula:

$$\sigma_j + \sigma_d \geq \sigma_{min} \qquad (2)$$

where $\sigma_j$ is a static load stress of a coal-rock mass, $\sigma_d$ is a dynamic load produced by seismic waves, and $\sigma_{min}$ is a critical stress for the occurrence of a rock burst.

Therefore, it is necessary to comprehensively evaluate the hazard degree of a rock burst in terms of the static load and the dynamic load; however, as the stress is a vector, the static load stress of the coal-rock mass is rapidly adjusted in the mining process, and meanwhile, it is difficult to construct a suitable stress parameter to characterize the dynamic load action of the seismic waves due to the complex action of the mine earthquake seismic waves to the coal-rock mass, so that it is hard to superpose the static and dynamic loads imposed on the coal-rock mass in the form of stress during the actual calculation. However, when a rock burst hazard is predicted, it is necessary to comprehensively evaluate the hazard degree of a rock burst in terms of the static load and the dynamic load, and the comprehensive evaluation indexes need be constructed for evaluating the rock burst hazard under the effect of superposition of dynamic and static loads.

Figure 4:
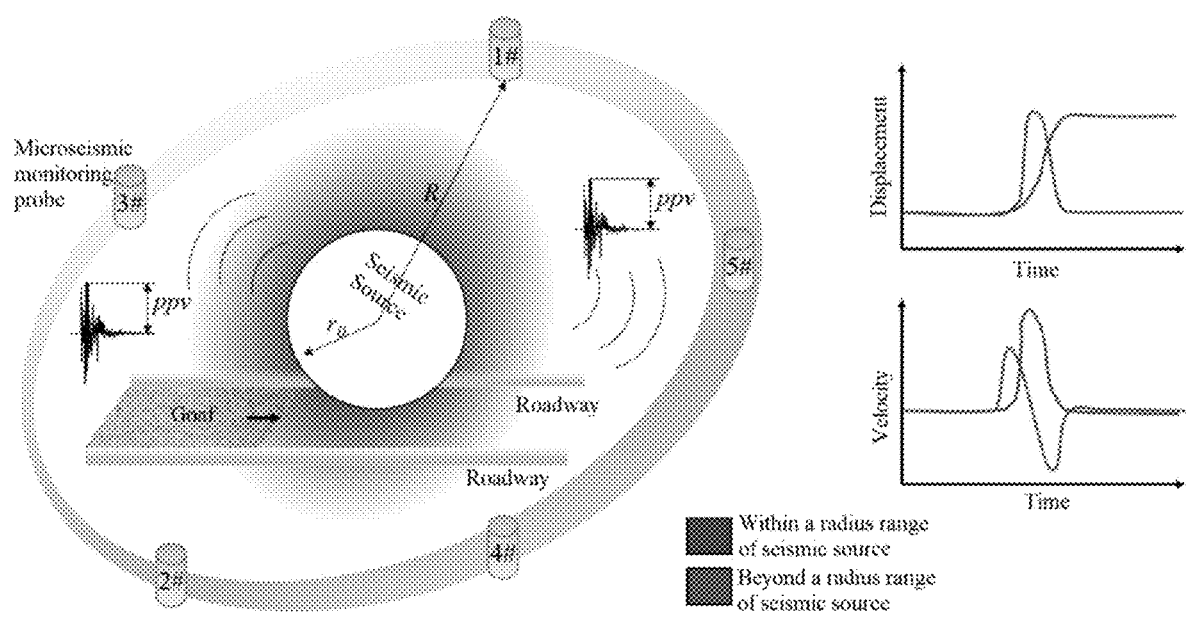
FIG. 4 is a schematic diagram of a peak particle velocity and energy attenuation of seismic wave propagation of a mine earthquake.

Under the disturbance of seismic waves, a coal-rock mass itself may also fracture and radiate seismic waves outwards, and the stress state is adjusted accordingly. Therefore, on the one hand, the seismic waves generated by the mine earthquake will disturb the coal-rock mass, and on the other hand, the seismic wave signal carries a lot of information about the coal-rock mass fracture and stress adjustment, which also creates a foundation for the inversion of the static and dynamic load levels of the coal-rock mass using the seismic wave signal. As a kind of waves, seismic waves have a typical feature that the amplitude and the energy will attenuate (as shown in FIG. 4) during the propagation, and thus accurately describing the seismic wave energy attenuation characteristics and calculating the residual energy of seismic waves after the propagation are the prerequisites for the above works.

Due to the geometric and inherent attenuation of the seismic waves, the residual energy of the seismic source energy propagating from a point j to a point i can be expressed as follows:

$$E_{ij} = E_j R_{ij}^{-2} e^{-\eta R_{ij}} \quad (3)$$

where $\eta$ is an energy attenuation coefficient; $E_{ij}$ is a residual energy at a loaded point, and $E_j$ is an energy of a microseismic event at a point j; and $R_{ij}$ is a linear distance between the point j and a point i.

In order to reflect the difference between the seismic effects within and beyond a rupture scale of the seismic source, the seismic source is assumed as a source sphere with a radius of $r_0$ ($r_0$ is the radius of the seismic source). Assuming that the energy of the seismic waves remains unchanged in the sphere and the energy begins to attenuate from a spherical surface, the attenuation process of the seismic source energy can be expressed as follows:

$$\begin{cases} E_{ij} = E_j (r_{ij} \leq r_0) \\ E_{ij} = E_j r_0^{-2} R_{ij}^{-2} e^{-\eta(R_j - r_0)} (R_{ij} > r_0) \\ r_0 = \sqrt[3]{\dfrac{3V_A}{4\pi}},\ V_A = \dfrac{M_0^2}{2GE_j} \end{cases} \quad (4)$$

where $r_0$ is an apparent radius of a seismic source, $V_A$ is an apparent volume of the seismic source, $M_0$ is a seismic moment of the seismic source, and G is a shear modulus of a seismic source area.

Under the action of wave front geometric diffusion and medium damping, both the peak particle velocity (ppv) and the energy of particles will attenuate during the propagation of seismic waves, and the attenuation can be expressed as follows:

$$\begin{cases} ppv_{ij} = ppv_j R_{ij}^{-1} e^{-\beta R_{ij}} \\ E_{ij} = E_j R_{ij}^{-2} e^{-\eta R_{ij}} \end{cases} \quad (5)$$

where $ppv_{ij}$ is a peak particle velocity of a loaded point; $ppv_j$ is a peak particle velocity at a seismic source; $\beta$ is a peak particle seismic velocity attenuation coefficient; and the seismic velocity and a kinetic energy at a particle meet the following relationship:

$$E_j = \frac{1}{2} m A_j^2 \quad (6)$$

where $E_j$ is an energy of a particle j; m is a unit mass of a medium of the particle j; and $A_j$ is a peak particle velocity (ppv) of the particle j.

It can be obtained by the simultaneous equations (4), (5) and (6) that:

$$\begin{cases} E_{ij} = E_j (r_{ij} \leq r_0) \\ E_{ij} = E_j r_0^{-2} R_{ij}^{-2} e^{-\eta(R_j - r_0)} (R_{ij} > r_0) \\ ppv_{ij} = ppv_j R_{ij}^{-1} e^{-\beta R_{ij}} (R_{ij} > r_0),\ \eta = 2\beta \end{cases} \quad (7)$$

where $ppv_{ij}$ is a peak particle velocity of a loaded point; $ppv_j$ is a peak particle velocity at a seismic source; and $\beta$ is a peak particle seismic velocity attenuation coefficient.

Figure 5:
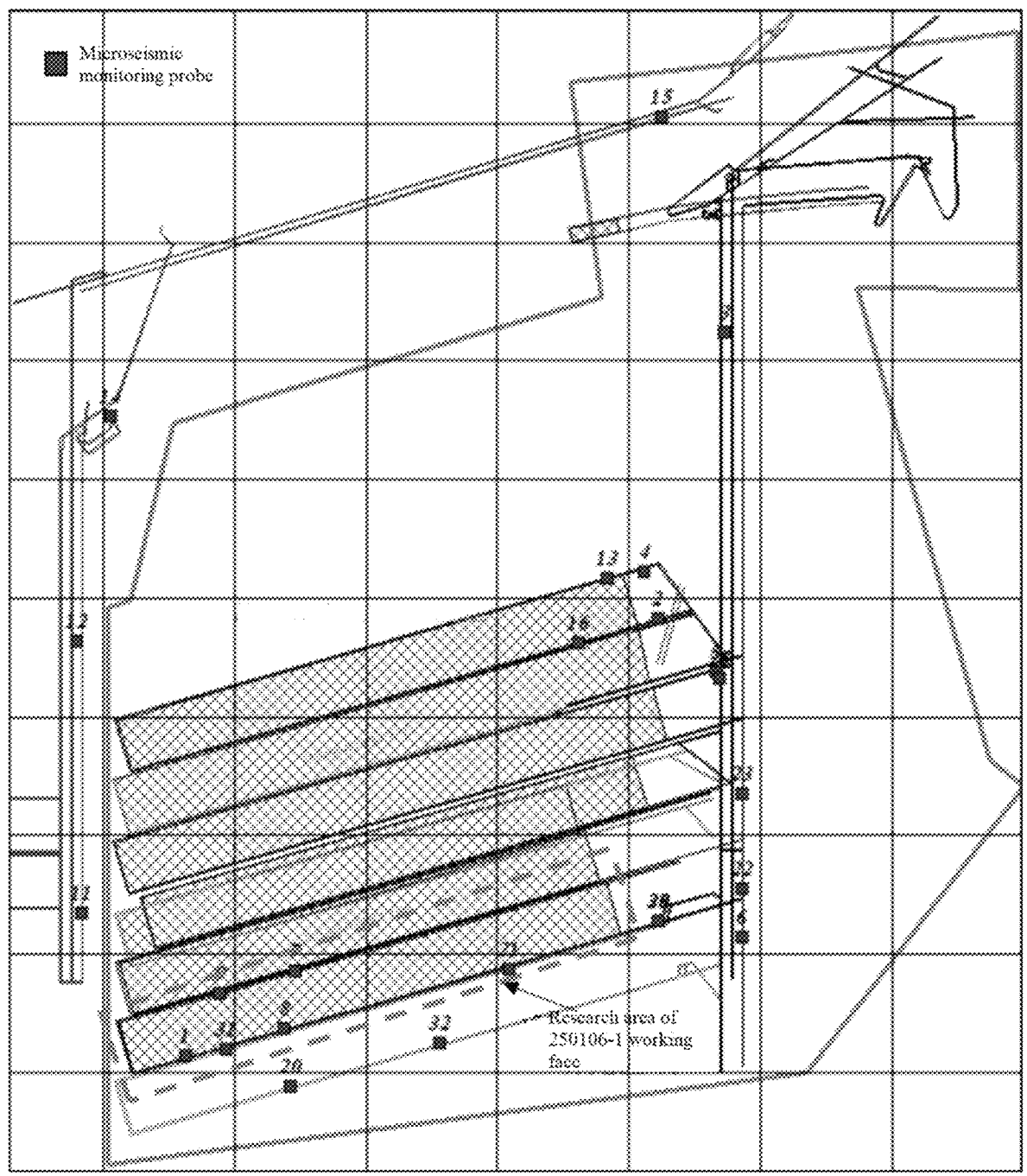
FIG. 5 is a layout diagram of a research area and a microseismic monitoring station.
Figure 6:
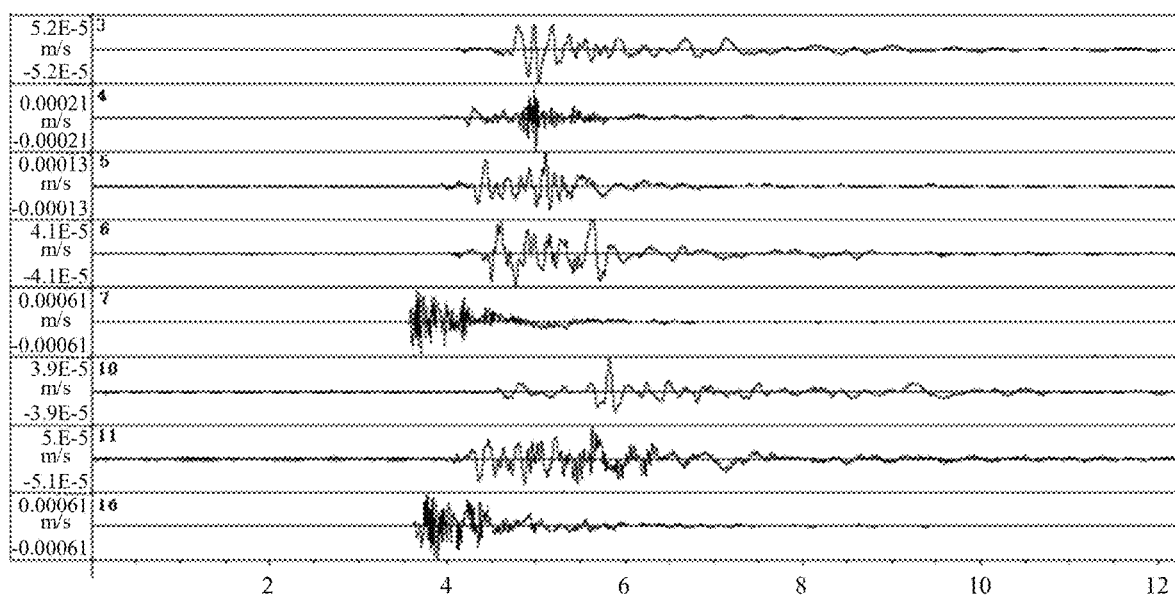
FIG. 6 is a typical seismic waveform diagram of a microseismic event within the research area.
Figure 7:
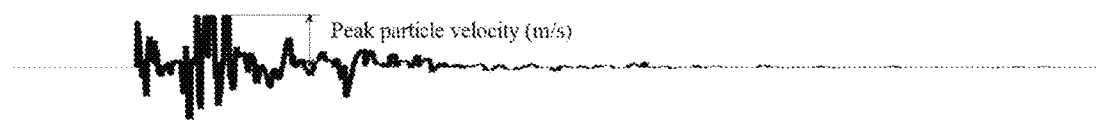
FIG. 7 is a schematic diagram of reading a peak particle velocity of a channel (probe) within the research area.
Figure 8:
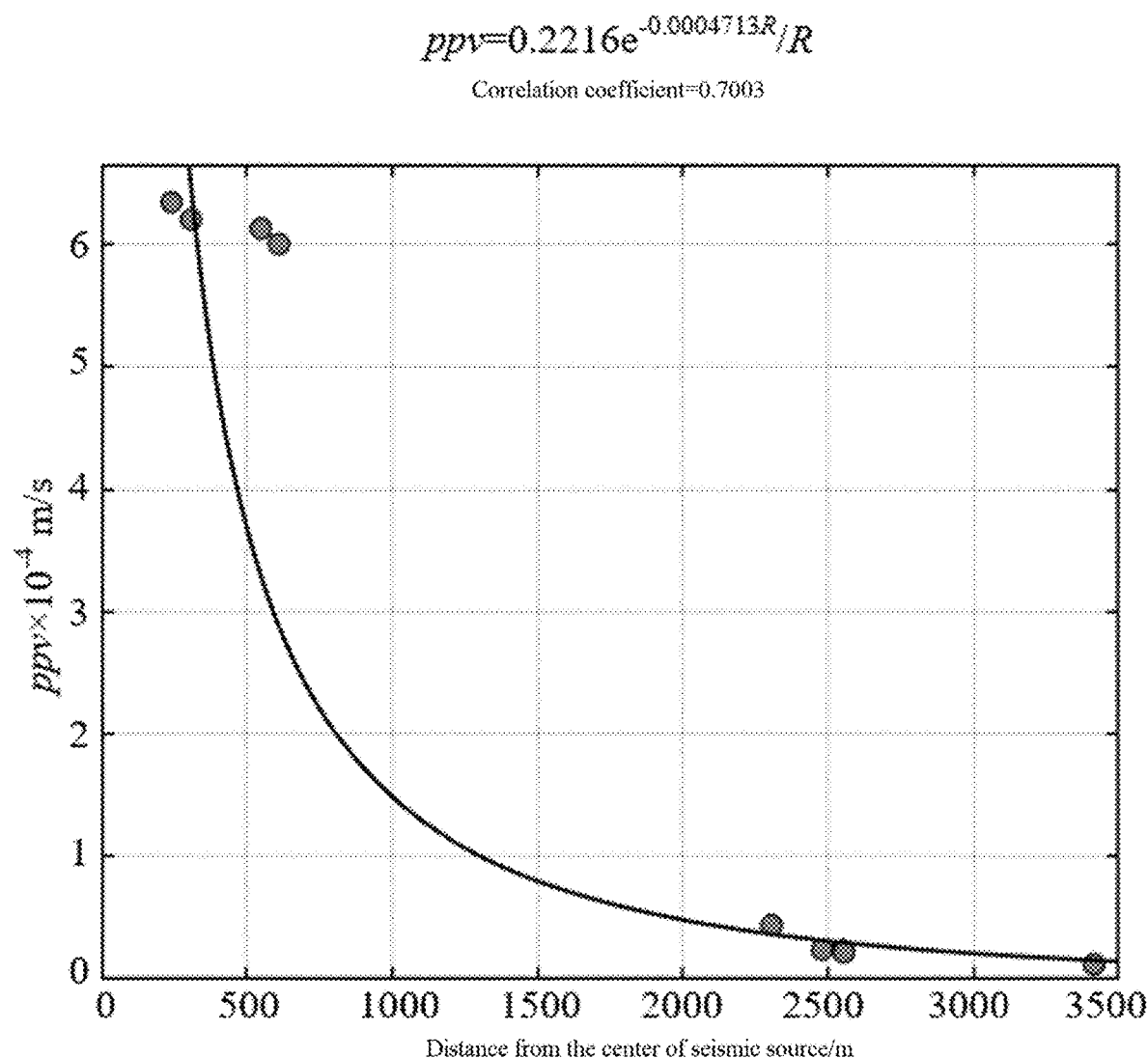
FIG. 8 is a schematic diagram of fitting an attenuation coefficient of a peak particle velocity of a microseismic event within the research area.
Figure 9:
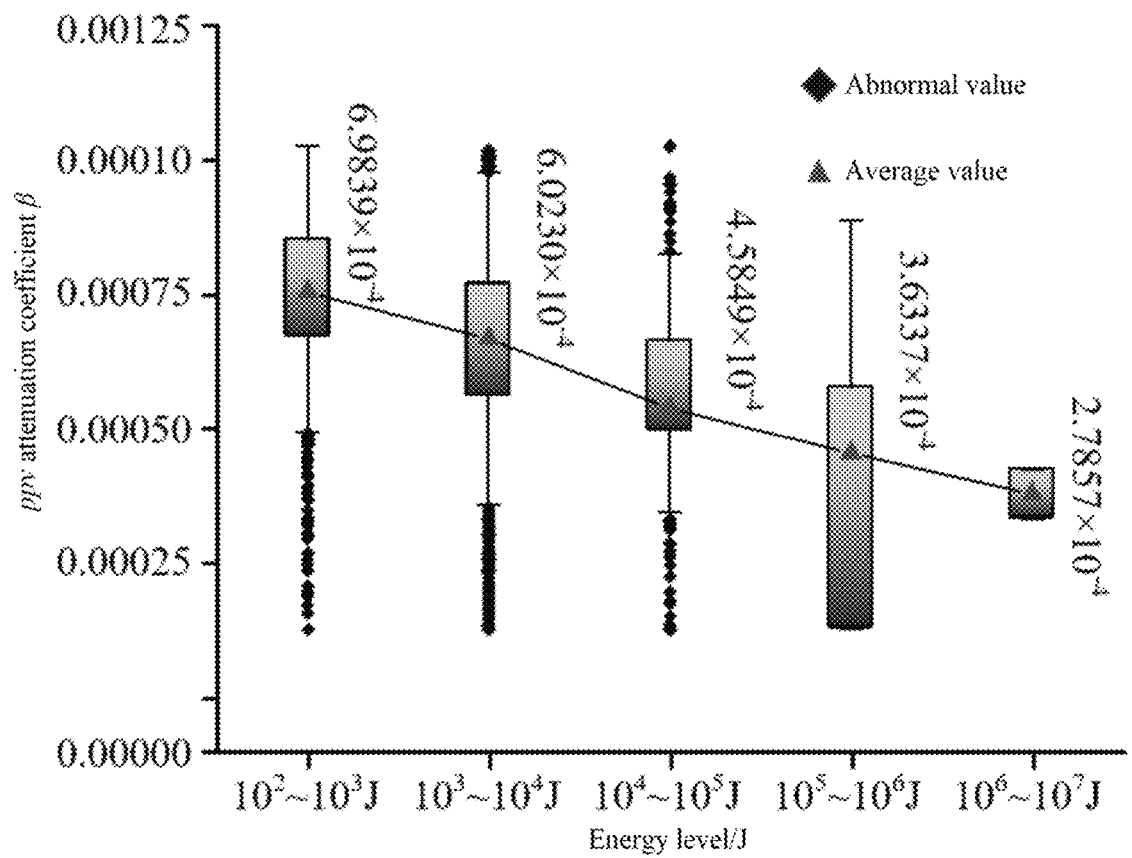
FIG. 9 is a statistical graph of energy attenuation coefficients of different seismic source energy levels within the research area.

The formula (7) can be used to describe the seismic wave energy attenuation characteristics of the mine earthquake and calculate the residual energy, while the microseismic monitoring system deployed in a rock burst mine can provide a basis for the acquisition and calculation of relevant parameters in formula (7). As shown in FIG. 5, microseismic monitoring probes are deployed around a mining face for monitoring seismic signals, and the waveforms monitored in a microseismic event are as shown in FIG. 6. By operation such as marking an arrival time of the waveforms, a seismic source coordinate, a seismic source energy, a seismic source radius, an apparent volume and a seismic moment can be calculated, and an earthquake occurrence time can be determined. FIG. 7 is a schematic diagram of local amplification of the waveform of a channel in FIG. 6. The peak particle velocity corresponding to the channel (probe) can be obtained by reading an amplitude value of the waveform in FIG. 7; then, the peak particle vibration velocity attenuation coefficient $\beta$ can be obtained by fitting the relationship between the peak particle velocity recorded by a plurality of probes not exceeding the range and the distance from the probe to the seismic source in a microseismic event (FIG. 8), the energy attenuation coefficient n can be further obtained, and after these seismic source parameters are obtained, the residual energy after attenuation can be calculated according to formula (7). Especially for mine earthquakes with different source energy levels, the attenuation coefficient varies greatly, so it is necessary to determine the value of the peak vibration particle velocity attenuation coefficient $\beta$ according to the seismic source energy level. FIG. 9 shows average values of the attenuation coefficients of the peak particle vibration velocities of seismic sources of different energy levels.

On the basis of obtaining the above parameters, a rock burst hazard prediction method based on seismic wave energy attenuation characteristics of a mine earthquake cluster is proposed, characterized by constructing a static load strength index based on the seismic wave energy attenuation characteristics of the mine earthquake cluster by considering the cumulative damage effect of the mine earthquake seismic waves on coal-rock masses; constructing a dynamic load strength index based on the energy attenuation characteristics of the mine earthquake cluster by considering the energy accumulation effect of the mine earthquake seismic waves; and then determining weights of both indexes using a mean square error method, and further constructing a comprehensive prediction index by superposing the two indexes to predict the rock burst hazard. The indexes are calculated by the following formulas:

$$\varepsilon_{eij} = \sum_{i=1}^{N} k\sqrt{E_{ij}} \quad (8)$$

$$\varepsilon_f = -\frac{\varepsilon_{ef}}{\ln(1 - D_F)} \quad (9)$$

$$\sigma_{si} = E\varepsilon_{eij} \exp\left(-\frac{\varepsilon_{eij}}{\varepsilon_f}\right) \quad (10)$$

$$\phi_{si} = \frac{\sigma_{si} - \sigma_{smin}}{\sigma_{smax} - \sigma_{smin}} \quad (11)$$

$$\sigma_{di} = \sum_{i=1}^{N} E_{ij} \quad (12)$$

$$\phi_{di} = \frac{\sigma_{di} - \sigma_{dmin}}{\sigma_{dmax} - \sigma_{dmin}} \quad (13)$$

The mean square error method is used to determine the weights of $\Phi_s$ and $\Phi_d$ and calculate the comprehensive prediction index, and the calculation formulas are as follows:

$$\phi_{sdi} = w_1\phi_{si} + w_2\phi_{di} = w_1\frac{\sigma_{si} - \sigma_{smin}}{\sigma_{smax} - \sigma_{smin}} + w_2\frac{\sigma_{di} - \sigma_{dmin}}{\sigma_{dmax} - \sigma_{dmin}} \quad (14)$$

$$w_1 = \frac{std(\phi_{si})}{std(\phi_{si}) + std(\phi_{di})} \quad (15)$$

$$w_2 = \frac{std(\phi_{di})}{std(\phi_{si}) + std(\phi_{di})} \quad (16)$$

According to the value of the comprehensive prediction index $\Phi_{sd}$, the predicted rock burst hazard can be classified into four levels:

TABLE 1

Correspondence between $\Phi_{sd}$ and Burst Hazard

| $\Phi$ | Level of Burst Hazard |
| --- | --- |
| $0 < \Phi \leq 0.25$ | None |
| $0.25 < \Phi \leq 0.50$ | Weak |
| $0.50 < \Phi \leq 0.75$ | Moderate |
| $0.75 < \Phi \leq 1$ | Strong |

Note:
in the table, $\Phi$ is any of $\Phi_s$, $\Phi_d$ and $\Phi_{sd}$.

The above-mentioned embodiments are only used for describing the preferred modes of the present invention, rather than limiting the scope of the present invention. Various variations and improvements made by those of ordinary skill in the art should fall into the protection scope defined by the claims of the present invention.

Figure 1:
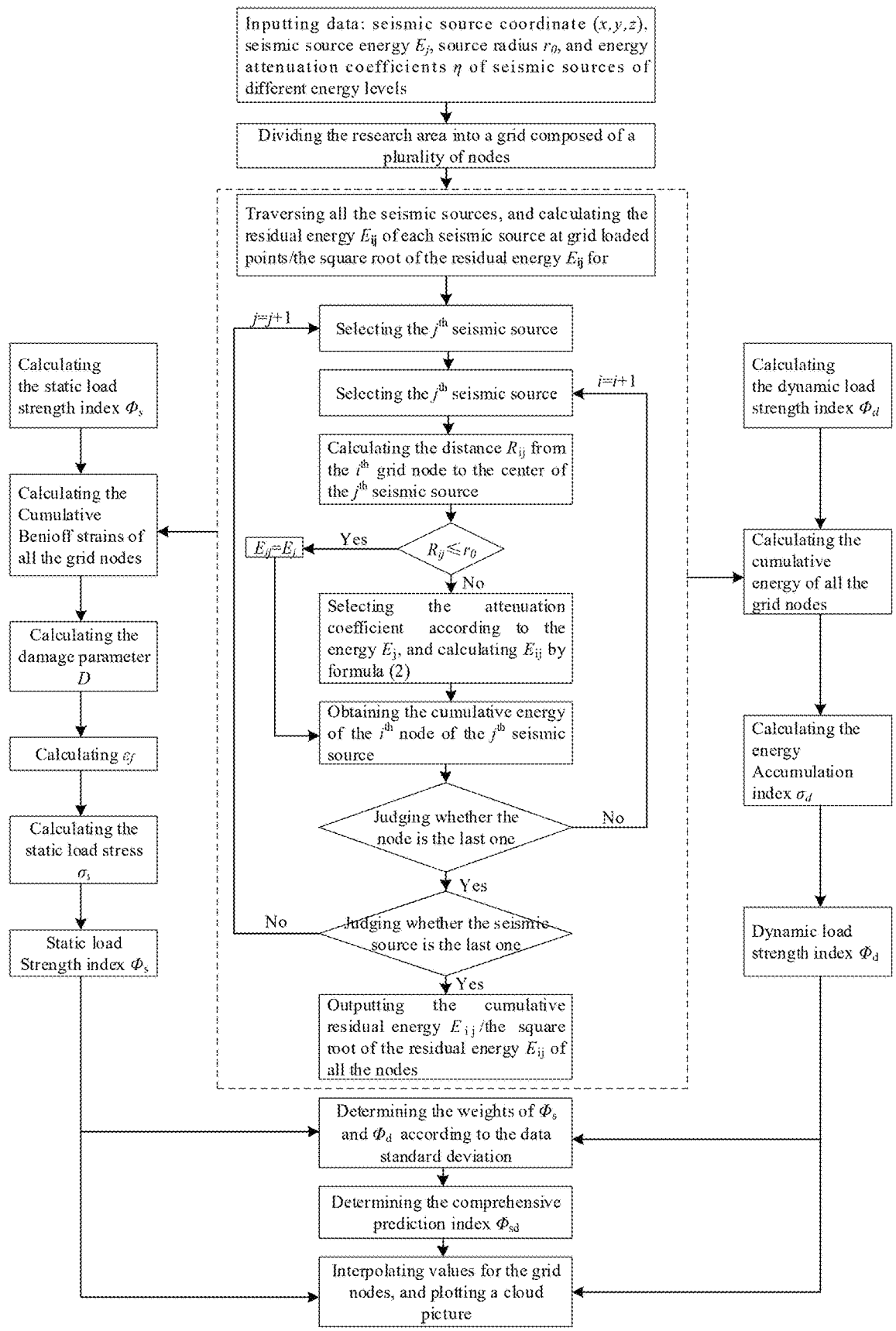
FIG. 1 is a flow chart of a rock burst hazard prediction method of the present invention.

In the example analysis, the microseismic monitoring data of the 250106-1 working face of a mine in Gansu during a mining period from Aug. 1, 2016 to Aug. 30, 2016 were selected for calculation and verification. A plurality of high-energy mine earthquakes (with a source energy of >$10^4$ J) occurred to the working face during the mining period from Aug. 1, 2016 to Aug. 30, 2016, and an impact behavior happened on Aug. 30, 2016 and resulted in mine roadway destruction as long as 80 m. The specific calculation process was as follows:

The method of the present invention was implemented in accordance with the flow chart as shown in FIG. 1:

(1) A microseismic event of the 250106-1 working face from Aug. 1, 2016 to Aug. 30, 2016 was adopted, the relationship between the peak particle velocities recorded by a plurality of probes not exceeding the range and the distances from the probes to the seismic source was fitted to obtain a peak particle vibration velocity attenuation coefficient. A schematic diagram of fitting is as shown in FIG. 8. Then an energy attenuation coefficient was calculated by the peak particle vibration velocity attenuation coefficient according to formula (7); similarly, the energy attenuation coefficients of microseismic events of different energy levels of the 250106-1 working face were calculated. The calculation results, as shown in Table 2, were used to calculate subsequent energy attenuation.

TABLE 2

Energy Attenuation Coefficients of Different Energy Levels for 250106-1 Working Face

| Range of Energy Level | Energy Attenuation Coefficient |
| --- | --- |
| $10^2$-$10^3$ J | $1.3968 \times 10^{-3}$ |
| $10^3$-$10^4$ J | $1.2046 \times 10^{-3}$ |
| $10^4$-$10^5$ J | $9.1698 \times 10^{-4}$ |
| $10^5$-$10^6$ J | $7.2674 \times 10^{-4}$ |
| $10^6$-$10^7$ J | $5.5714 \times 10^{-4}$ |

Figure 10:
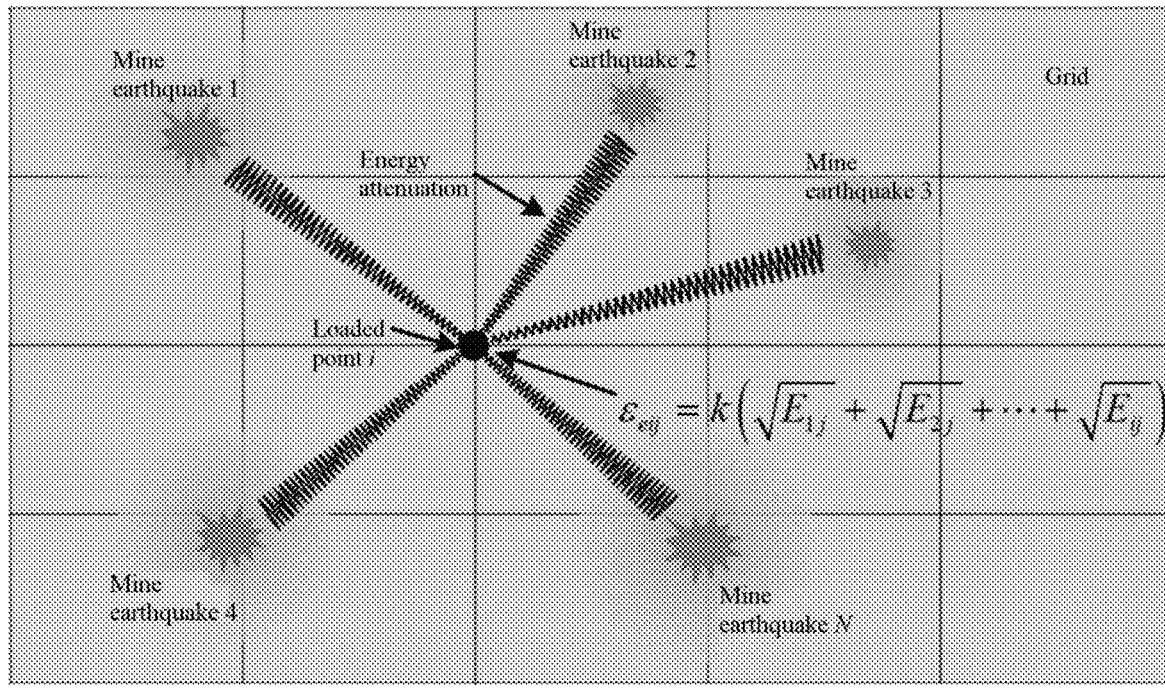
FIG. 10 is a schematic diagram of grid division and calculation of cumulative residual energy within the research area.
Figure 11:
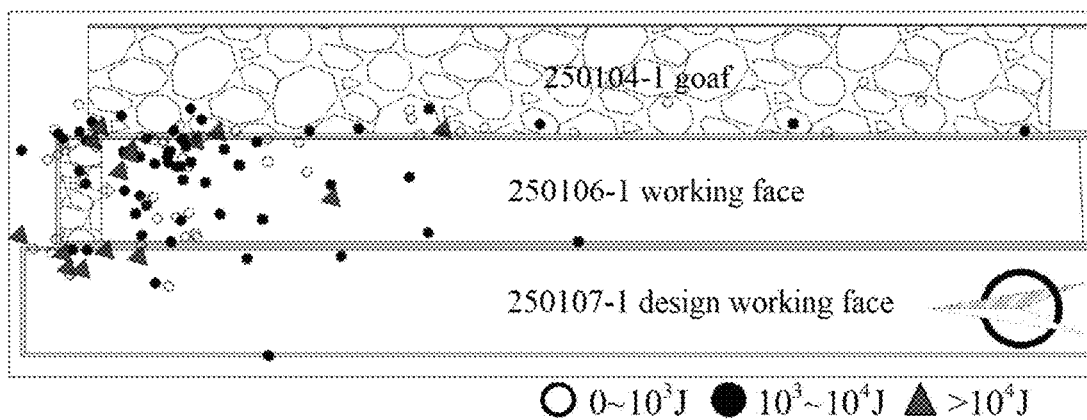
FIG. 11 is an analysis diagram of a prediction example of the research area from Aug. 1, 2016 to Aug. 10, 2016.
Figure 12:
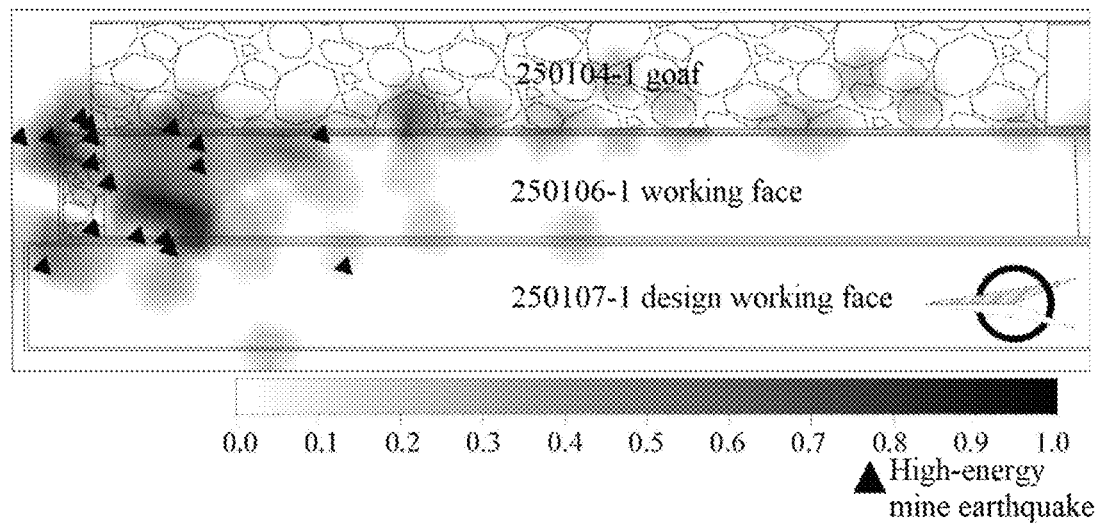
FIG. 12 is an analysis diagram I of the prediction example of the research area on Aug. 11, 2016.
Figure 13:
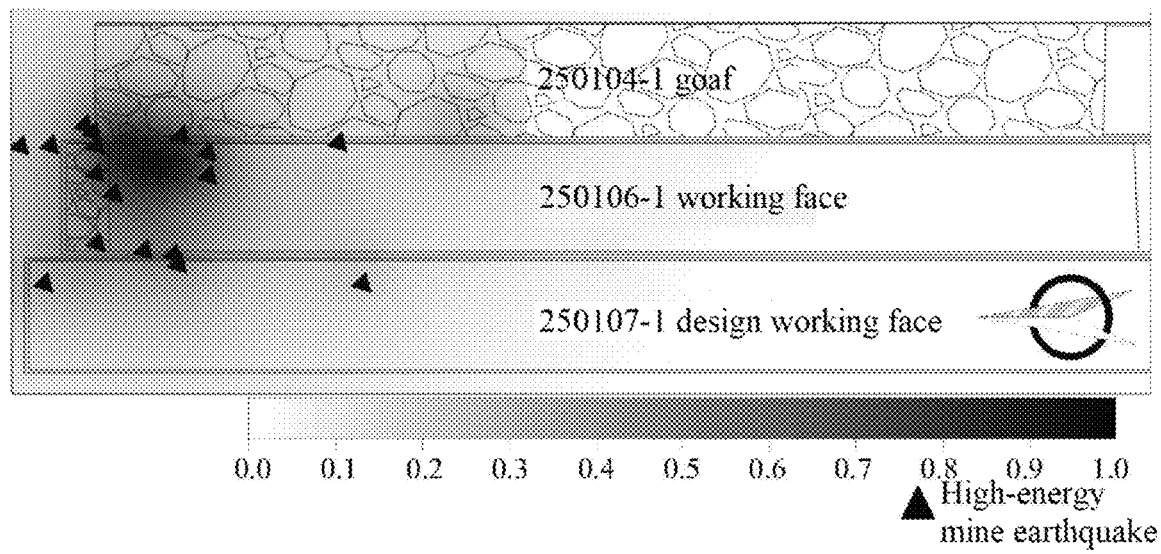
FIG. 13 is an analysis diagram II of the prediction example of the research area on Aug. 11, 2016.
Figure 14:
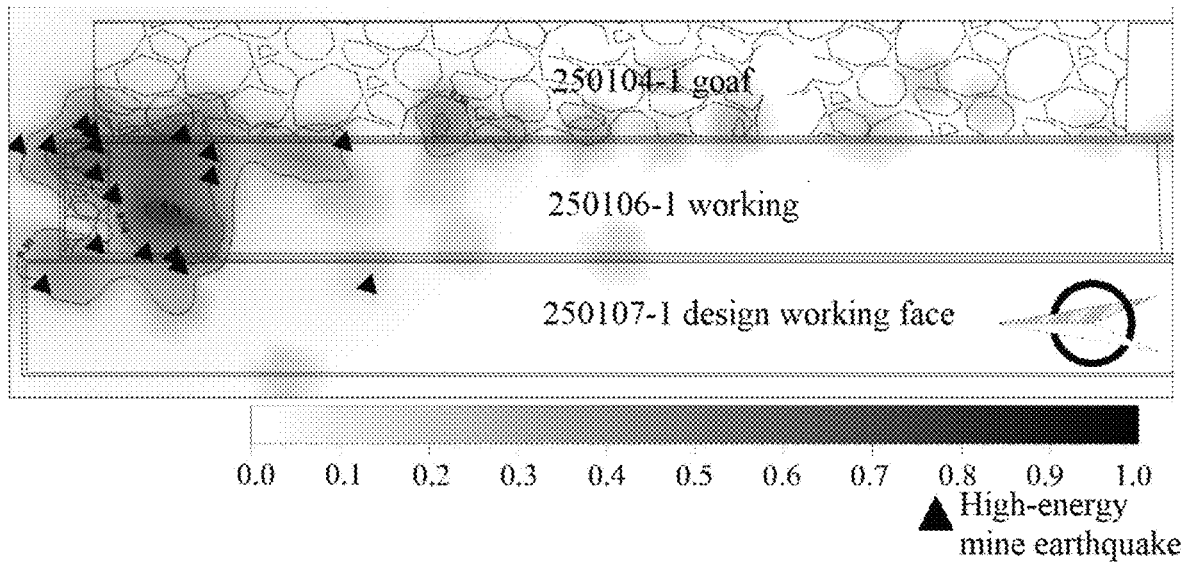
FIG. 14 is an analysis diagram III of the prediction example of the research area from Aug. 11, 2016.
Figure 15:
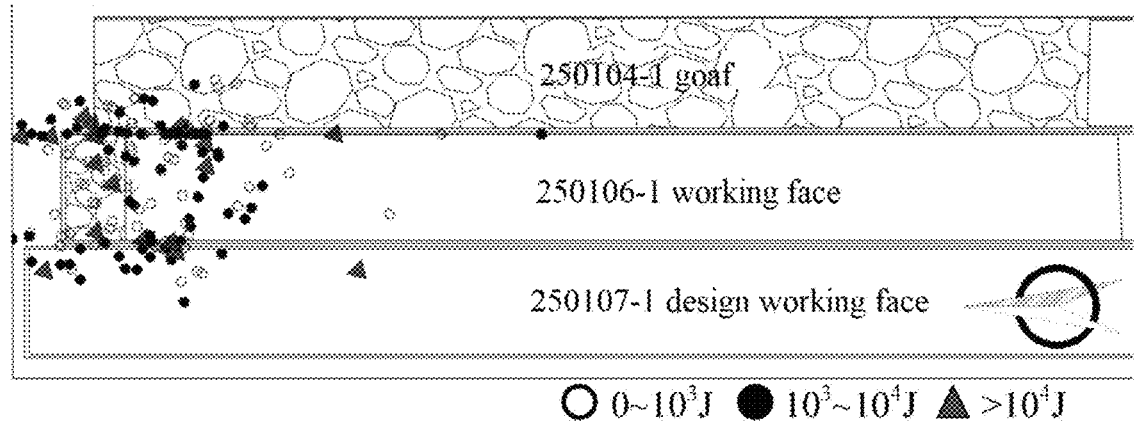
FIG. 15 is an analysis diagram of the prediction example of the research area from Aug. 11, 2016 to Aug. 20, 2016.
Figure 16:
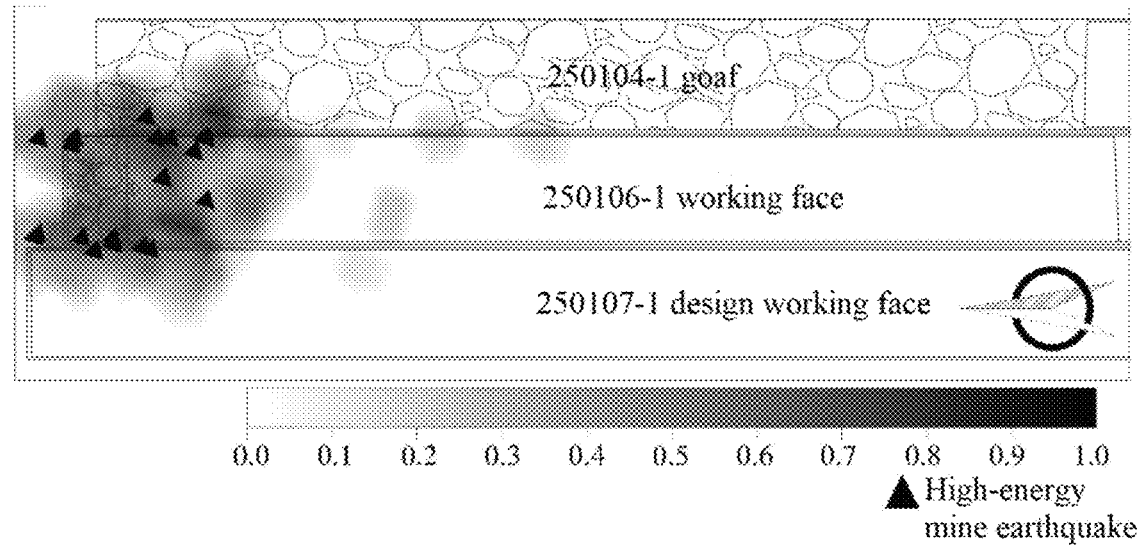
FIG. 16 is an analysis diagram I of the prediction example of the research area on Aug. 21, 2016.
Figure 17:
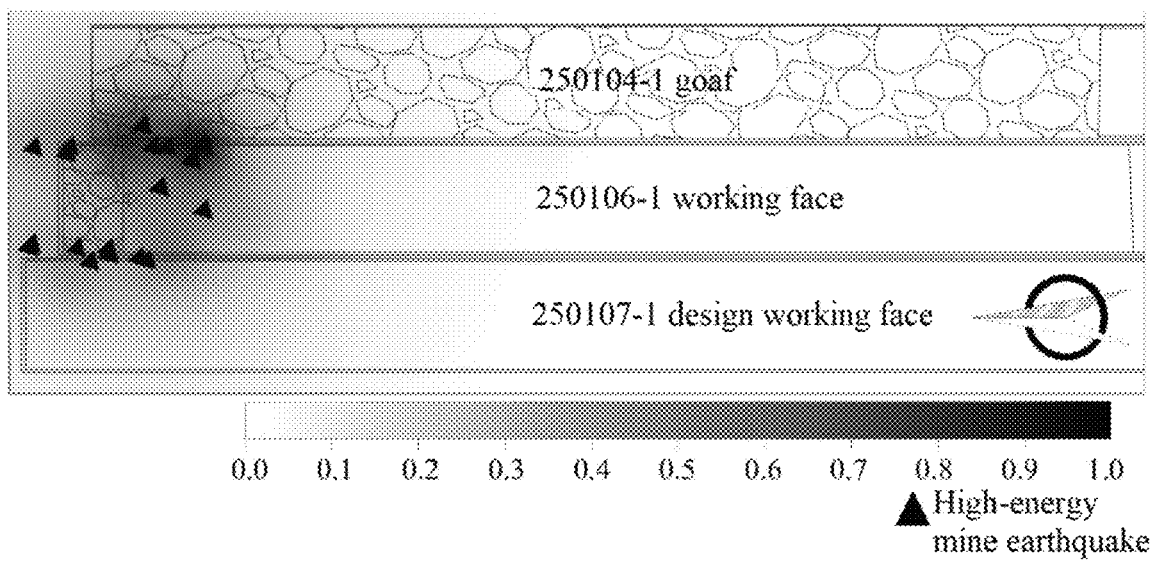
FIG. 17 is an analysis diagram II of the prediction example of the research area on Aug. 21, 2016.
Figure 18:
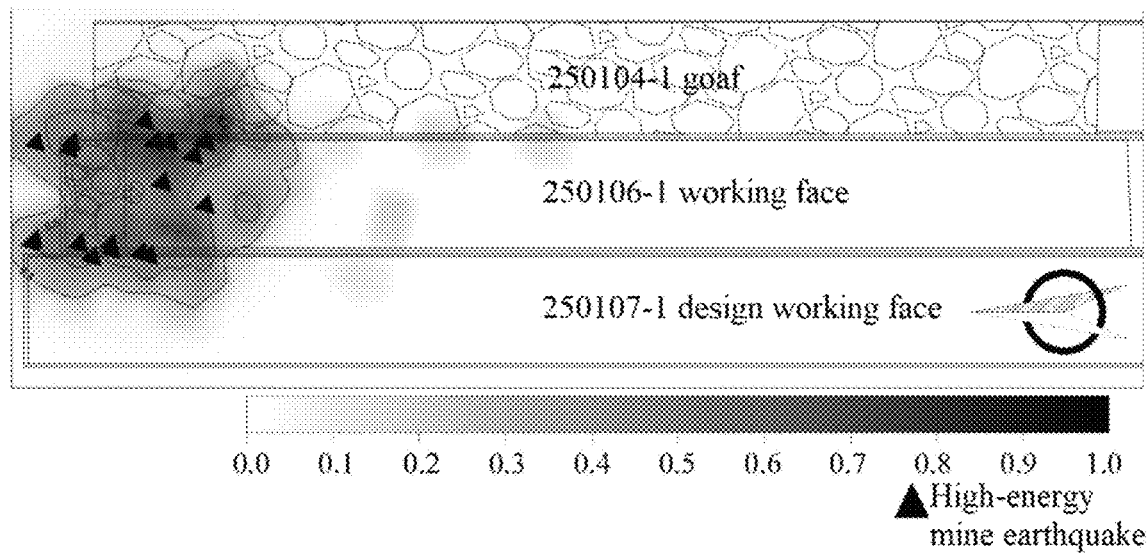
FIG. 18 is an analysis diagram III of the prediction example of the research area from Aug. 21, 2016.
Figure 19:
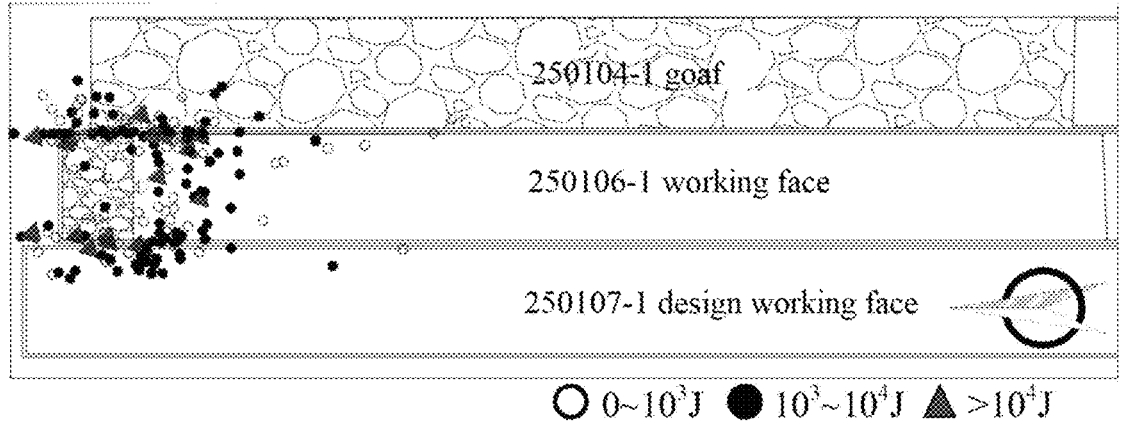
FIG. 19 is an analysis diagram of the prediction example of the research area from Aug. 21, 2016 to Aug. 29, 2016.
Figure 20:
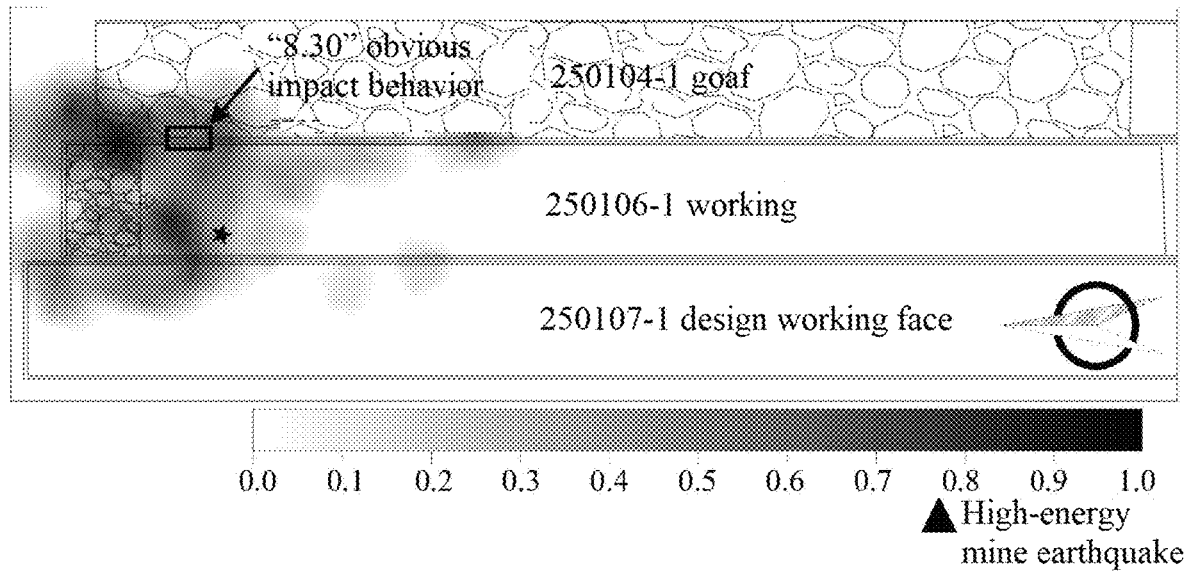
FIG. 20 is an analysis diagram I of the prediction example of the research area on Aug. 29, 2016.
Figure 21:
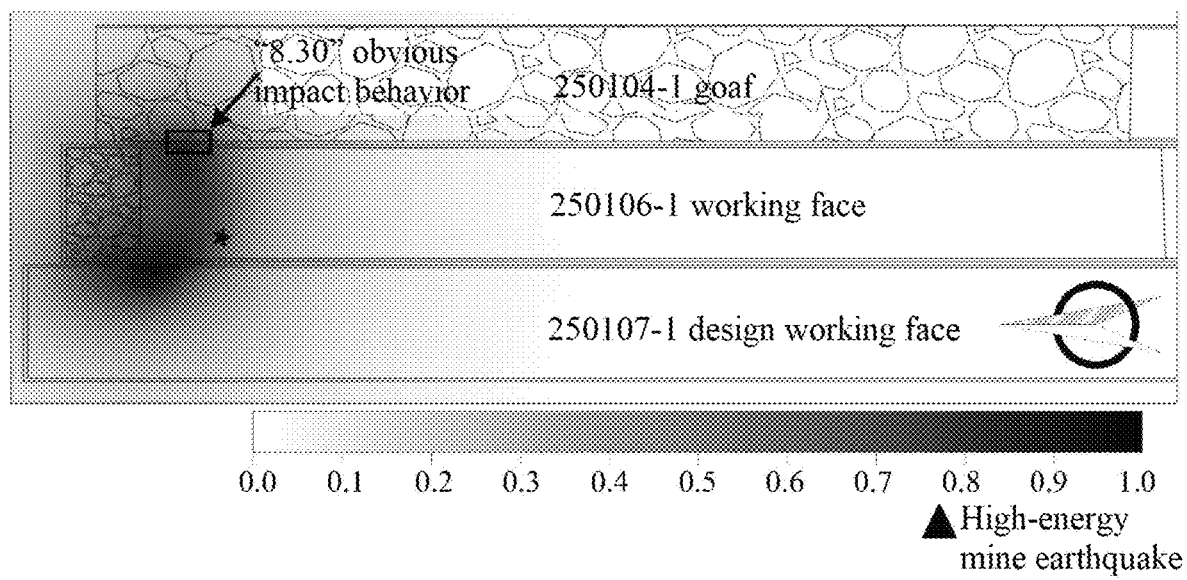
FIG. 21 is an analysis diagram II of the prediction example of the research area on Aug. 29, 2016.
Figure 22:
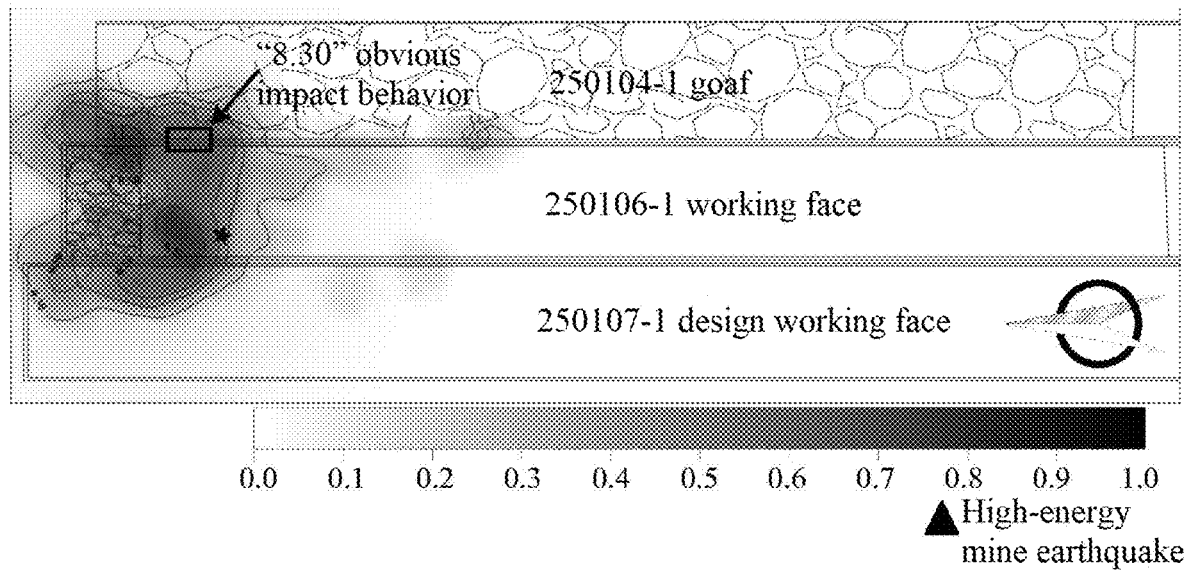
FIG. 22 is an analysis diagram III of the prediction example of the research area from Aug. 29, 2016.

(2) A research area was determined according to the 250106-1 working face and the range of mine earthquake activities (FIG. 11), the research area was divided into a grid area composed of a plurality of nodes as shown in FIG. 10; then the residual energy and the cumulative Benioff strain of each grid node were calculated according to formula (7) and the diagram for calculating the energy attenuation in FIG. 7 to facilitate the subsequent calculation of indexes. (3) The implementation process of the present invention was calculated by three phases. Calculation was performed using the data from Aug. 1, 2016 to Aug. 10, 2016 (FIG. 11), from Aug. 11, 2016 to Aug. 20, 2016 (FIG. 15) and from Aug. 21, 2016 to Aug. 30, 2016 (FIG. 19), respectively; the static load strength index $\Phi_s$ was calculated by formulas (8)-(11), and the calculation results are as shown in FIG. 12, FIG. 16 and FIG. 20, respectively; the dynamic load strength index $\Phi_d$ was calculated by formulas (12)-(13), and the calculation results are as shown in FIG. 13, FIG. 17 and FIG. 21, respectively; and the comprehensive prediction index $\Phi_{sd}$ was calculated by formulas (14)-(16), and the calculation results are as shown in FIG. 14, FIG. 18 and FIG. 22, respectively. (4) The implementation effects of the present invention were verified by three phases. In order to verify the prediction results, the high-energy mine earthquakes (with a source energy of $10^4$ J) and impact behavior positions within 10 days after the day of prediction were located in the cloud pictures of prediction indexes in FIG. 12, FIG. 13, FIG. 14, FIG. 16, FIG. 17, FIG. 18, FIG. 20, FIG. 21 and FIG. 22, respectively, and the prediction effects of the prediction indexes were analyzed.

The hazard areas were judged in accordance with the correspondence between the prediction indexes and the burst hazard in Table 1. When the predicted high-energy mine earthquakes fell into the predicted burst hazard area of moderate and higher levels, the prediction could be considered to be successful.

The example indicates that the static load strength index $\Phi_s$ and the dynamic load strength index $\Phi_d$ obtained by inversion can only be used to predict part of high-energy mine earthquakes and impact behavior areas; however, it can be known from FIG. 14, FIG. 18 and FIG. 22 that the prediction accuracy rate (number of accurately predicted mine earthquakes/number of inaccurately predicted mine earthquakes) of the comprehensive prediction index $\Phi_{sd}$ obtained by inversion to high-energy mine earthquakes can reach 71% and 89%, respectively, and completely predicted the impact behavior positions, with a good predictive effect.

What is claimed is:

1. A rock burst hazard prediction method based on seismic wave energy attenuation characteristics of a mine earthquake cluster, comprising predicting a rock burst hazard through the seismic wave energy attenuation characteristics of the mine earthquake cluster by comprehensively considering static load and dynamic load effects of seismic waves of the mine earthquake cluster; wherein
the rock burst hazard prediction method comprises the following steps:
constructing a static load strength index based on the seismic wave energy attenuation characteristics of the mine earthquake cluster by considering a cumulative damage effect of mine earthquake seismic waves on coal-rock masses;
constructing a dynamic load strength index based on the energy attenuation characteristics of the mine earthquake cluster by considering an energy accumulation effect of the mine earthquake seismic waves; and
determining weights of the static load strength index and the dynamic load strength index using a mean square error method, and further constructing a comprehensive prediction index by superposing the static load strength index and the dynamic load strength index to predict the rock burst hazard.

2. The rock burst hazard prediction method based on the seismic wave energy attenuation characteristics of the mine earthquake cluster according to claim 1, wherein a seismic source of a mine earthquake is assumed as a sphere with a radius of $r_0$, and a residual energy of seismic waves of the seismic source in the mine earthquake cluster after propagation attenuation is calculated by the following formula:

$$\begin{cases} E_{ij} = E_j (r_{ij} \leq r_0) \\ E_{ij} = E_j r_0^{-2} R_{ij}^{-2} e^{-\eta(R_j - r_0)} (R_{ij} > r_0) \\ ppv_{ij} = ppv_j R_{ij}^{-1} e^{-\beta R_{ij}} (R_{ij} > r_0), \eta = 2\beta \end{cases}$$

wherein $E_{ij}$ is the residual energy of the seismic source in the mine earthquake cluster after propagation from a point j to a point i, wherein the point j is a position of a center of the seismic source; $E_j$ is an energy of the seismic source at the point j; $ppv_{ij}$ is a peak particle velocity caused by the propagation of seismic waves radiated by the seismic source from the point j to the point i; $ppv_j$ is a peak particle velocity of the seismic source at the point j; $R_{ij}$ is a linear distance between the point j and the point i; $r_0$ is the radius of the seismic source; $\eta$ is an energy attenuation coefficient; and $\beta$ is a peak particle seismic velocity attenuation coefficient, and $\beta$ is obtained by fitting a relationship between the peak particle velocity recorded by a plurality of probes not exceeding a measuring range in a microseismic monitoring system and a distance from each probe to the seismic source.

3. The rock burst hazard prediction method based on the seismic wave energy attenuation characteristics of the mine earthquake cluster according to claim 2, wherein the radius $r_0$ of the seismic source is calculated by the following formula:

$$\begin{cases} r_0 = \sqrt[3]{\dfrac{3V_A}{4\pi}} \\ V_A = \dfrac{M_0^2}{2GE_j} \end{cases}$$

wherein $V_A$ is an apparent volume of the seismic source; G is a shear modulus of a coal-rock mass; $M_0$ is a seismic moment of the seismic source; and $E_s$ is an energy of the seismic source.

4. The rock burst hazard prediction method based on the vibration wave energy attenuation characteristics of the mine earthquake cluster according to claim 3, wherein a research area is divided into a grid formed by several nodes, and a residual energy of vibration waves after attenuation, the static load strength index and the dynamic load strength index are calculated by using a same grid model.

5. The rock burst hazard prediction method based on the vibration wave energy attenuation characteristics of the mine earthquake cluster according to claim 2, wherein a research area is divided into a grid formed by several nodes, and a residual energy of vibration waves after attenuation, the static load strength index and the dynamic load strength index are calculated by using a same grid model.

6. The rock burst hazard prediction method based on the seismic wave energy attenuation characteristics of the mine earthquake cluster according to claim 1, wherein the static load strength index is calculated by the following formula:

$$\varepsilon_{eij} = \sum_{i=1}^{N} k\sqrt{E_{ij}}$$

$$\varepsilon_f = -\dfrac{\varepsilon_{ef}}{\ln(1-D_F)}$$

$$\sigma_{si} = E\varepsilon_{eij}\exp\left(-\dfrac{\varepsilon_{eij}}{\varepsilon_f}\right)$$

$$\phi_{si} = \dfrac{\sigma_{si} - \sigma_{smin}}{\sigma_{smax} - \sigma_{smin}}$$

wherein $\varepsilon_{eij}$ is a cumulative Benioff strain at any node i in a grid area; N is a total number of grid nodes; $\varepsilon_{ef}$ is a maximum of $\varepsilon_{eij}$ among the grid nodes in the grid area; $D_F$ is a critical damage value, wherein the critical damage value is 0.95; $\sigma_{si}$ is a static load stress index at any node i, and E is an elastic modulus of a coal-rock mass; $\Phi_{si}$ is a static load strength index at any node i; $\sigma_{smax}$ is a maximum of $\sigma_{si}$ among all nodes in the grid area; and $\sigma_{smin}$ is a minimum of $\sigma_{si}$ among all the nodes in the grid area.

7. The rock burst hazard prediction method based on the vibration wave energy attenuation characteristics of the mine earthquake cluster according to claim 6, wherein a research area is divided into a grid formed by several nodes, and a residual energy of vibration waves after attenuation, the static load strength index and the dynamic load strength index are calculated by using a same grid model.

8. The rock burst hazard prediction method based on the vibration wave energy attenuation characteristics of the mine earthquake cluster according to claim 1, wherein the dynamic load strength index is calculated by the following formula:

$$\sigma_{di} = \sum_{j=1}^{N} E_{ij}$$

$$\phi_{di} = \dfrac{\sigma_{di} - \sigma_{dmin}}{\sigma_{dmax} - \sigma_{dmin}}$$

wherein $\sigma_{di}$ is an energy accumulation index at any node i in a grid area; $\Phi_{di}$ is a dynamic load strength index at any node i; $\sigma_{dmax}$ is a maximum of $\sigma_{di}$ among all nodes in the grid area; and $\sigma_{dmin}$ is a minimum of $\sigma_{di}$ among all the nodes in the grid area.

9. The rock burst hazard prediction method based on the vibration wave energy attenuation characteristics of the mine earthquake cluster according to claim 8, wherein a research area is divided into a grid formed by several nodes, and a residual energy of vibration waves after attenuation, the static load strength index and the dynamic load strength index are calculated by using a same grid model.

10. The rock burst hazard prediction method based on the vibration wave energy attenuation characteristics of the mine earthquake cluster according to claim 1, wherein the comprehensive prediction index is calculated by the following formula:

$$\phi_{sdi} = w_1\phi_s + w_2\phi_d = w_1\frac{\sigma_{si}-\sigma_{smin}}{\sigma_{smax}-\sigma_{smin}} + w_2\frac{\sigma_{di}-\sigma_{dmin}}{\sigma_{dmax}-\sigma_{dmin}}$$

wherein $\Phi_{sdi}$ is a comprehensive prediction index value at any node i in a grid area; $w_1$ and $w_2$ are weights of $\Phi_s$ and $\Phi_d$ determined by using the mean square error method, respectively, and both $w_1$ and $w_2$ are ranging between 0 and 1;

$w_1$ and $w_2$ are calculated by the following formulas, respectively:

$$w_1 = \frac{std(\phi_{si})}{std(\phi_{si}) + std(\phi_{di})}$$

$$w_2 = \frac{std(\phi_{di})}{std(\phi_{si}) + std(\phi_{di})}$$

wherein std ($\Phi_{si}$) is a square error of $\Phi_{si}$ at all nodes in the grid area; and std ($\Phi_{di}$) is a square error of $\Phi_{di}$ at all the nodes in the grid area.

11. The rock burst hazard prediction method based on the vibration wave energy attenuation characteristics of the mine earthquake cluster according to claim 10, wherein a research area is divided into a grid formed by several nodes, and a residual energy of vibration waves after attenuation, the static load strength index and the dynamic load strength index are calculated by using a same grid model.

12. The rock burst hazard prediction method based on the vibration wave energy attenuation characteristics of the mine earthquake cluster according to claim 1, wherein when a residual energy $E_{ij}$ of vibration waves after propagation attenuation is calculated, an energy attenuation coefficient is selected according to an energy level of a seismic source.

13. The rock burst hazard prediction method based on the vibration wave energy attenuation characteristics of the mine earthquake cluster according to claim 1, wherein a research area is divided into a grid formed by several nodes, and a residual energy of vibration waves after attenuation, the static load strength index and the dynamic load strength index are calculated by using a same grid model.

14. The rock burst hazard prediction method based on the vibration wave energy attenuation characteristics of the mine earthquake cluster according to claim 1, wherein a hazard level is classified into four levels: none, weak, moderate and strong; and a predicted object is a high-energy mine earthquake or impact behavior area.

* * * * *